United States Patent [19]

Hopfner et al.

[11] 4,052,726
[45] Oct. 4, 1977

[54] EXPOSURE CONTROL APPARATUS

[75] Inventors: Clemens Hopfner; Wolfgang Ort, both of Stuttgart, Germany

[73] Assignee: Eastman Kodak Company, Rochester, N.Y.

[21] Appl. No.: 652,026

[22] Filed: Jan. 26, 1976

Related U.S. Application Data

[63] Continuation of Ser. No. 471,402, May 20, 1974, abandoned.

[30] Foreign Application Priority Data

June 14, 1973 Germany .............................. 2330253

[51] Int. Cl.² .............................................. G03B 7/14
[52] U.S. Cl. ...................................... 354/29; 354/31; 354/43; 354/51
[58] Field of Search .................. 354/26, 42, 29, 43, 354/30, 47, 34, 49, 38, 59, 43, 254, 50, 260, 266, 51, 267, 31, 204, 60 R, 251

[56] References Cited

U.S. PATENT DOCUMENTS

| | | | |
|---|---|---|---|
| 2,931,285 | 4/1960 | Hahn et al. | 354/251 |
| 3,326,103 | 6/1967 | Topaz | 354/34 |
| 3,500,729 | 3/1970 | Rentschler et al. | 354/51 |
| 3,672,267 | 6/1972 | Harvey et al. | 354/29 |
| 3,673,415 | 6/1972 | Yoshimura et al. | 354/51 X |
| 3,709,113 | 1/1973 | Wood | 354/50 |
| 3,924,263 | 12/1975 | Alessi | 354/50 |
| T922,009 | 10/1973 | Alessi | 354/31 |

Primary Examiner—L. T. Hix
Assistant Examiner—William B. Perkey
Attorney, Agent, or Firm—T. H. Close

[57] ABSTRACT

A camera shutter having a light-responsive circuit that regulates movement of the shutter to effect an exposure of duration related to actual scene brightness, an exposure-limiting device that operates to limit the duration of the exposure to correspond to a predetermined scene brightness, means for selectively disabling the exposure-limiting device, and shutter reset apparatus that, if the exposure-limiting device is disabled during an exposure, reenables the device when the shutter is reset.

3 Claims, 3 Drawing Figures

EXPOSURE CONTROL APPARATUS

This application is a continuation of application Ser. No. 471,402 filed May 20, 1974, now abandoned, in the names of Clemens Hopfner and Wolfgang Ort entitled EXPOSURE CONTROL APPARATUS.

BACKGROUND OF THE INVENTION

1. Field of the Invention

The invention relates generally to a resettable shutter having apparatus that normally limits the duration of an exposure to correspond to a predetermined scene brightness and apparatus to selectively disable the limiting apparatus to provide an exposure of extended duration that corresponds to actual scene brightness, and more particularly to apparatus that re-enables the limiting apparatus after disablement each time the shutter is reset.

2. Description of the Prior Art

Because of the difficulty in hand holding a camera steady throughout a long exposure, the duration of an automatically controlled exposure provided by some cameras is often limited to a maximum interval related to the longest time that the camera can be effectively held steady by hand. Various apparatus have been used to control the duration of the exposure while limiting its duration to a predetermined maximum. One such apparatus uses a primary timing device whose output is related to actual scene brightness, that is operated concurrently with an auxiliary timing device whose output is independent of scene brightness. The outputs of the timing devices are compared and if the output of the primary timing device has not terminated the exposure prior to the exposure reaching the predetermined maximum interval, the output of the auxiliary timing device terminates the exposure. Commonly assigned, copending U.S. application Ser. No. 409,228 filed Sept. 13, 1973 in the name of Robert V. Alessi, discloses such a timing device, in which a primary timing circuit is responsive to scene brightness and an auxiliary timing circuit, operated independently of light and concurrently with the light-responsive timing circuit, limits the duration of the exposure. This device includes a switch that is actuatable to disable the auxiliary timing circuit so that the light-responsive timing circuit may provide an extended exposure that is related to actual scene brightness. However, in such prior art devices, the operator must remember to reset the switch to effect an exposure of limited duration after the extended duration exposure feature has been used. To forget to re-enable the limited-duration exposure, often results in blurred photographs.

SUMMARY OF THE INVENTION

In accordance with the invention, a camera shutter includes a light-controlled circuit to regulate the duration of exposure in relation to scene brightness, means normally active for limiting the duration of the exposure to correspond to a predetermined scene brightness, means for disabling the limiting means to permit an exposure of extended duration to be made and shutter reset means for resetting the shutter and for reenabling the limiting means after it has been disabled, each time the shutter is reset.

BRIEF DESCRIPTION OF THE DRAWINGS

The invention, and its objects and advantages, will become more apparent in the Detailed Description of the Preferred Embodiment presented in conjunction with the accompanying drawing in which.

DETAILED DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Figure 1:
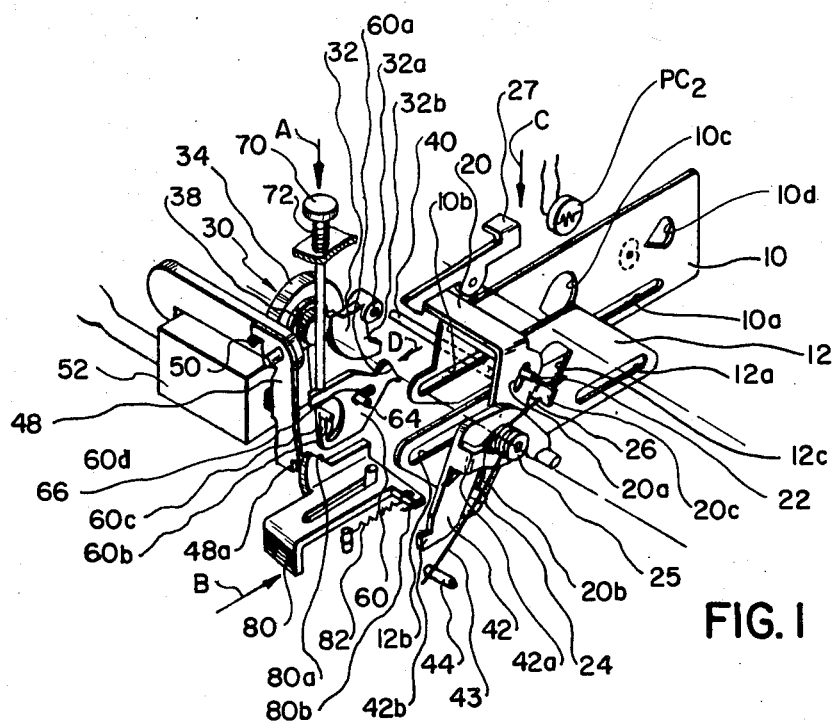
FIG. 1 is an exploded view of a shutter embodying the present invention.

A preferred embodiment of the invention is incorporated into a diaphragm shutter, shown in FIG. 1, that includes shutter sliders 10, 12 which are slidably mounted on a base plate (not shown) for motion in opposed direction. Pins (not shown) on one side of the base plate are received in slots 10a, 10b, 12a, 12b on the sliders 10, 12 respectively to mount the sliders 10, 12 and to guide them during cooperative movement. The sliders 10, 12 define teardrop apertures 10c, 12c respectively that are positioned on the sliders 10, 12 to become overlapping to form an exposure aperture as the sliders 10, 12 move. The slider 10 also includes a teardrop aperture 10d that is movable relative to a photosensitive element $PC_2$ to unmask increasingly larger portions of the latter to light as the slider 10 moves. To drive the sliders 10, 12, a transmission element 20 is coupled to the sliders 10, 12, respectively, by a pin 22 on slider 10 received in a slot 20a and a pin 24 on the slider 12 received in a slot 20b. The transmission element 20 is pivotally mounted about a pin 25 and biased in a counterclockwise direction by a spring 26. The spring 26 is coupled between a lug 20c of the transmission element 20 and a lug 42a of a shutter closing number to be discussed later. The pin-slot arrangement is such that as the spring 26 moves the transmission element 20 in a counterclockwise direction, the slider 10 moves to the left and the slider 12 moves to the right. An aperture of increasingly larger size is thus formed. A shutter release 27 engages and retains the transmission element 20 against movement by the spring 26, and in the position shown, the shutter release 27 is rotatable in a clockwise direction to release the transmission element 20.

The opening rate of the sliders 10, 12 is controlled by an escapement mechanism 30 that is mounted on one side of the base plate and consists of an escapement disc 32 and a flywheel disc 34. The flywheel disc 34 is rotatably mounted about the pin 25, and the escapement disc 32 is pivotally mounted about a pivot 32a and engages the flywheel disc 34 via a toothed segment 38. The escapement disc 32 includes a cam 32b that cooperates with the shutter sliders 10, 12 via a pin 40 carried by the shutter slide 10. The pin 40 extends through a slot of the base plate (not shown).

A shutter closing member 42 is also rotatably mounted about the pin 25, and is biased in a clockwise direction by a closing spring 43. The closing spring 43 is tensioned between the lug 42a (that also anchors one end of the spring 26) and a pin 44 of the base plate. A tab 42b of the closing member 42 engages a detent 48a of a pawl 48 to prevent the closing member 42 from being moved by the spring 43. The pawl 48 is spring-biased into engagement with the tab 42b and lies against an anchor pin 50. The pawl 48 is attractable to an electromagnet 52, part of an electronic control circuit 54. When attracted thereto, it rotates clockwise to release the tab 42b and thus effect release of the closing member 42 to move the shutter sliders 10, 12 to terminate an exposure.

Figure 3:
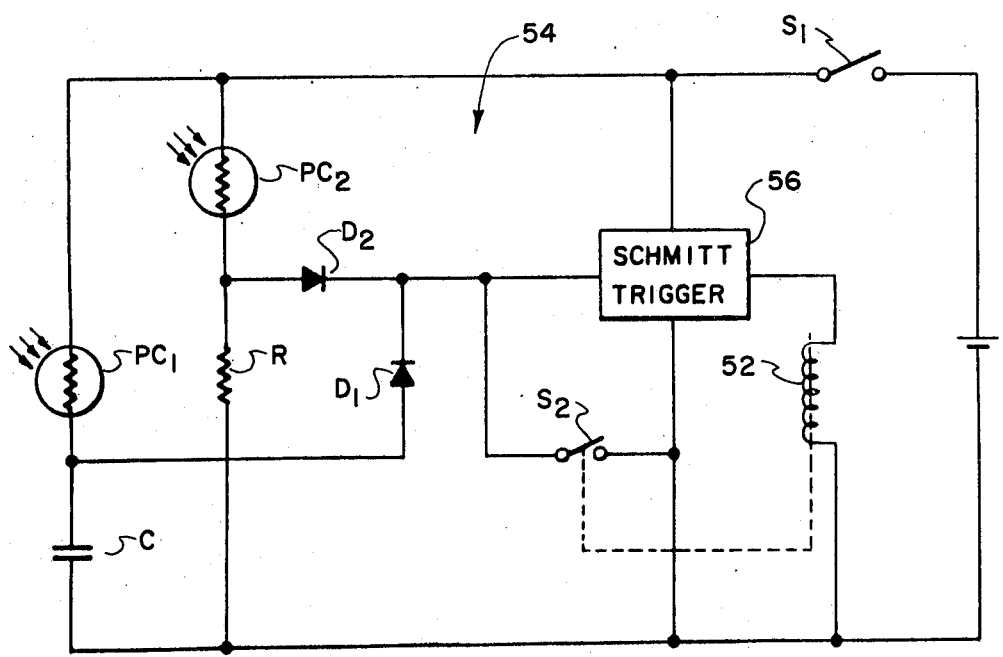
FIG. 3 is a schematic diagram of an electronic circuit useful with the invention.

To control the closing operation of the diaphragm shutter in relation to the intensity of actual scene brightness (by energizing the electromagnet 52 to release the closing member 42), the control circuit 54, of FIG. 3, includes a photocell $PC_1$ and the second photocell $PC_2$, previously referred to. The photocell $PC_1$ is connected with a capacitor C to form a conventional RC-timing network, and the photocell $PC_2$ is connected with a resistor R to form a light-level sensing network. The RC and light-level sensing networks are connected to a trigger circuit 56, which may be of the Schmitt Trigger type, via diodes $D_1$ and $D_2$ respectively. The diodes $D_1$ and $D_2$ isolate the operation of the RC network from the light-level sensing network and vice versa. During the formation of an aperture that ranges between a minimum and maximum size, the light-level sensing network controls the closure of the sliders 10, 12 in relation to scene brightness. The RC network controls closure of the sliders 10, 12 after the sliders 10, 12 have moved to form an aperture of maximum size. During the opening of the sliders 10, 12 toward the maximum aperture size, the voltage at the input of the trigger circuit 56 increases as the resistance of photocell $PC_2$ decreases due to increasing amounts of light as the opening aperture 10d moves over the photocell $PC_2$. When scene brightness is below a predetermined level, the voltage at the input of the trigger circuit 56 is below the threshold level and results in a full aperture being formed i.e. the sliders 10, 12 move the full distance to the left and right respectively. When the full aperture is formed, the voltage input from the RC network continues to increase until the diode $D_2$ becomes reverse biased and the light-level sensing network becomes ineffective. The circuit 54 then functions as a conventional RC-timing circuit. The output of the trigger circuit 56 controls energization or de-energization of the electromagnet 52. Through closure of the switch $S_2$, when the electromagnet 52 becomes energized, the capacitor C is discharged each time the exposure terminates.

To effect an exposure of duration limited to for example 1/30 sec., the pin 40 cooperates with a control member 60 that normally occupies a limited-duration exposure position as shown in FIG. 1. The control member 60 may be moved to a position shown in FIG. 2 so that the apparatus may effect an exposure of extended duration, e.g. ⅛ sec. The control member 60 is slidably and pivotally mounted on a pin-slot guide means 64, 66, the pin 64 being located on one side of the base plate. The control member 60 may be laterally moved as the pin 40 engages an end 60a or may be pivoted in a counterclockwise direction by a knob 70. The knob 70 is normally biased by a spring 72 in a direction away from the control member 60 (opposite to the arrow "A"). The control member 60 is, moreover, provided with an extension 60d having a slope surface 60e (FIG. 2) that, when the control member 60 is laterally moved, engages and pivots the pawl 48 to release the tab 42b from the detent 48a. The knob 70 may be depressed in the direction of arrow "A" to rotate the control member 60 in a counterclockwise direction to prevent the slope 60e from engaging the pawl 48. When the control member 60 is moved counterclockwise, a catch 60b moves from an upper engagement recess 74 of the base plate to a lower engagement recess 76 to lock the control member 60 in a lower "disabled" position. The catch 60b is arranged on a spring arm 60c of the control member 60 so that it may be resiliently engaged or disengaged from the engagement recesses 74, 76.

A cocking and/or transport slider 80, arranged below the control member 60 is movable in the direction of the arrow "B" against the bias of a resetting spring 82, and comprises a cam 80a which cooperates with the lower part of the control member 60 to reset the control member 60. Additionally, an extension 80b is positioned to engage and cock the closing member 42 as the slider 80 is moved.

Figure 2:
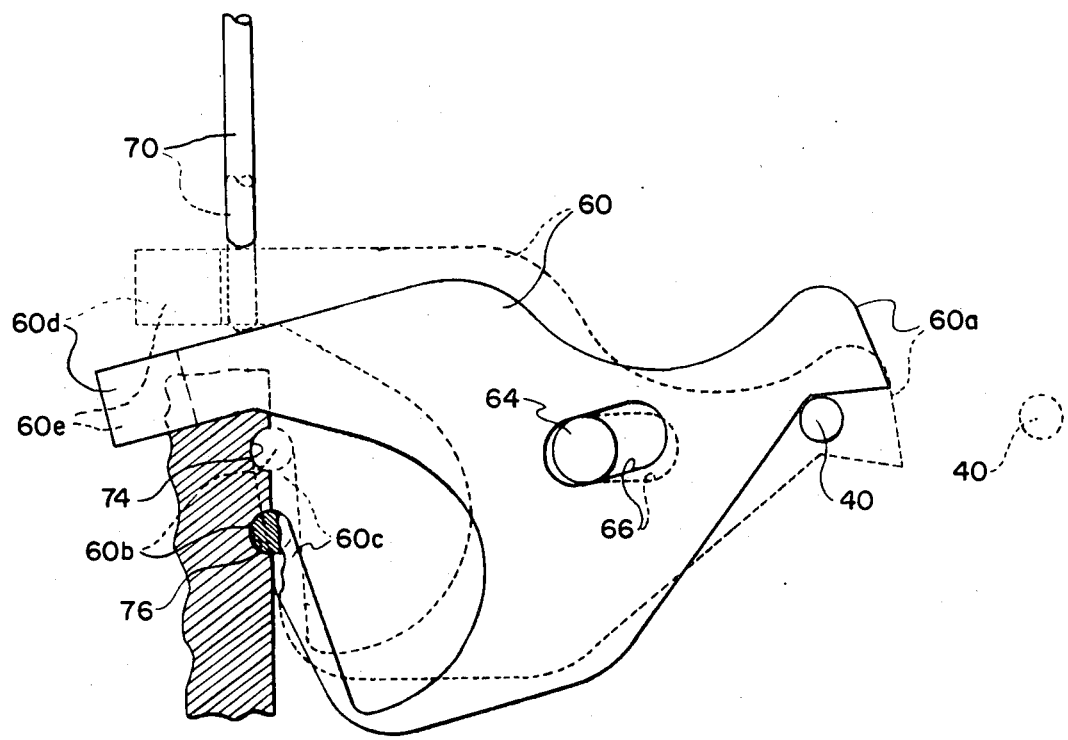
FIG. 2 is a partial view of an exposure-limiting device of the present invention shown in a disabled position.

The device operates as follows. When the release 27 is moved in the direction of the arrow "C", a power switch $S_1$ of the circuit 54 is closed and the transmission element 20 is released to move the shutter sliders 10, 12 toward an open position i.e. to form an exposure aperture as the apertures 10c and 12c coincide. During such movement, the opening 10d in the shutter slider 10 and an opening in the base plate (not shown) form an aperture in front of photocell $PC_2$. Photocell $PC_1$, shown only in FIG. 2, is placed on the camera to be exposed to scene light without regulation by an aperture.

During the opening movement of the shutter sliders 10, 12, prior to reaching a maximum aperture and after an aperture of size is formed that produces proper exposure for the existing scene brightness, the exposure-control circuit 54 energizes the electromagnet 52 through operation of the light-level sensing network. The pawl 48 is attracted to the electromagnet 52 (pivoted clockwise) and the tab 42b disengages from the detent 48a, releasing the closing member 42 for its clockwise rundown movement. During this movement, a top portion of the closing member 42 engages the lug 20c of the transmission element 20 (that has moved up and to the left as the sliders 10, 12 are moved) and shutter sliders 10, 12 are driven in the opposite directions to terminate the exposure. Because the opening spring 26 is tensioned between the transmission element 20 and the closing member 42, relative movement of these members in opposite directions releases the spring 26. Thus the closing spring 43 does not act against the opening spring 26 when closing the sliders 10, 12.

In order to provide a very fast shutter speed, the escapement disc 32 is designed and positioned such that the shutter sliders 10, 12, and thus the pin 40 can be moved a preset distance before the pin 40 engages the escapement disc 32. Only then are they retarded by the pin 40 striking the escapement disc 32.

The exposures referred to occur in response to scene brightness at specific aperture settings, the shortest exposure time being associated with the smallest exposure aperture and the exposure time of 1/30 sec., which is still suitable for hand-held exposures, with the maximum exposure aperture. In order that the exposure that is limited to for example 1/30 sec. is not exceeded, the control member 60, effects the closing of the sliders 10, 12 when the limiting value is reached i.e. when the maximum aperture is attained. To effect the closing of the shutter sliders 10, 12, the pin 40, attached to the shutter slider 10, strikes against the end 60a of the control member 60 and laterally shifts the control member 60 in the direction of the arrow "D". The slope surface 60e of the extension 60d engages and pivots the pawl 48 clockwise; the closing member 42 is thus released for driving the shutter sliders 10, 12 to terminate the exposure. By this mechanical control of the shutter-closing operation coming into effect when the maximum aperture is reached, an exposure time-limiting value of e.g. 1/30 sec. is achieved; unintended extended exposures are avoided automatically.

This limiting of the exposure duration, however, leads to underexposures when the level of scene brightness is low, and an exposure duration of for example ⅛ sec. is required for proper exposure.

If such an extended exposure in response to scene brightness is desired, e.g. when a tripod is used, the control member 60 can be disabled. When such is desired, the knob 70 is pushed in the direction of arrow "A" so that the control member 60 is pivoted counter-clockwise and moved from its upper-locking position shown in FIG. 1, into its lower-locking position shown in FIG. 2. In this lower-locking position, the catch 60b becomes locked in recess 76 and the pin 40 passes underneath the control member 60. When the sliders 10, 12 are released, in the case of this preselected mode of operation, they open until the apertures 10c, 12c produce a maximum aperture, and shutter is closed in response to scene brightness under control of the RC-timing network of electronic control circuit 54. That is, after a time related to actual scene brightness, the electromagnet 52 becomes energized to attract the pawl 48.

To prevent the user from making an unintended extended exposure, the limited-duration exposure becomes re-enabled, if it has been disabled, each time the sliders 10, 12 are reset after use. If the control member 60 is locked in its lower-locking position of FIG. 2, the cam 80a will strike the control member 60 and urge it clockwise from its lower into its upper-locking position (the catch 60b becomes locked in the engagement recess 74) each time the slider 80 is operated to reset the shutter sliders 10, 12. The extension 80b also engages the closing element 42, rotating it counterclockwise and the tab 42b engages the detent 48a. The sliders 10, 12 having been latched by the release 27 when the closing member 42 rotates clockwise to drive the sliders 10, 12 closed, the shutter is ready for another exposure.

The invention has been described in detail with particular reference to preferred embodiments thereof, but it will be understood that variations and modifications can be effected within the spirit and scope of the invention.

We claim:

1. In a camera having exposure-control apparatus to regulate the passage of light to expose film, light-responsive means for regulating said apparatus to expose the film over an interval corresponding to the level of scene brightness, means for limiting the duration of said interval to correspond to a predetermined scene brightness and means for resetting the apparatus after each exposure, the improvement comprising:

selectively actuatable means for disabling said limiting means; and means, responsive to operation of said resetting means to reset said apparatus, for re-enabling said limiting means after each use in which said limiting means is disabled.

2. In a camera having a resettable shutter mounted for movement between light-blocking and unblocking positions for regulating exposure of film to scene light, the combination comprising:

drive means, operatively associated with said shutter, for moving said shutter between said positions;

timing-circuit means, including photosensitive means disposed to receive scene light, for regulating said drive means to move said shutter between said positions so as to provide an exposure of duration related to actual scene brightness;

means cooperating with said shutter and normally effective for limiting said exposure to a predetermined duration;

selectively operable means, associated with said limiting means, for disabling said limiting means; and means for resetting said shutter and for concurrently re-enabling said limiting means, if disabled by operation of said selectively operatable means, each time said shutter is reset.

3. In a camera, a diaphragm shutter comprising:

first and second diaphragm blades;

means for moving said diaphragm blades from a light-blocking to an unblocking position and back to said blocking position to effect an exposure;

regulating means, cooperative with said moving means and including photosensitive means positioned to receive scene light, for regulating the movement of said diaphragm blades to effect such exposure for an interval of time related to scene brightness;

limiting means, normally disposed in a first, operative, position and being actuatable to cause said moving means to move said diaphragm blades to limit the duration of said interval, said limiting means being movable to a second, inoperative, position to permit said regulating means to regulate said moving means to effect an exposure in relation to actual scene brightness over an interval of time in excess of said limited duration;

selectively operable means for moving said limiting means to said second position; and reset means, cooperative with said moving means and said limiting means, for resetting said diaphragm blades and, when said limiting means has been moved to said second position, for moving said limiting means to said first position each time said reset means is operated to reset said diaphragm blades.

* * * * *